United States Patent [19]

Friesen

[11] 4,299,603
[45] Nov. 10, 1981

[54] SELF-CLEANING SCREEN ASSEMBLY FOR RADIATOR AIR INLETS

[76] Inventor: Peter Friesen, R.R. #1, Box 314, Group 24, Winkler, Manitoba, Canada, R0G 2X0

[21] Appl. No.: 29,661

[22] Filed: Apr. 13, 1979

Related U.S. Application Data

[63] Continuation-in-part of Ser. No. 918,815, Jun. 26, 1978, abandoned.

[51] Int. Cl.³ .................... B01D 46/26; B60K 11/04
[52] U.S. Cl. ....................................... 55/290; 55/352; 55/385 B; 55/404; 55/408; 180/68 P
[58] Field of Search ............ 180/68 P; 55/290, 385 B, 55/404, 408, 405, 351, 352

[56] References Cited
U.S. PATENT DOCUMENTS

| 1,649,220 | 11/1927 | Goodloe | 55/290 |
|-----------|---------|---------|--------|
| 1,860,697 | 5/1932 | Traviss | 55/290 |
| 3,002,585 | 10/1961 | Pasturczak | 55/290 |
| 3,475,883 | 11/1969 | Sullivan | 55/290 |
| 3,816,981 | 6/1974 | Carnewal et al. | 55/290 X |

Primary Examiner—Joseph F. Peters, Jr.
Assistant Examiner—Milton L. Smith
Attorney, Agent, or Firm—Stanley G. Ade

[57] ABSTRACT

A casing is secured to the front of the radiator air intake of a tractor and a cylindrical screen assembly is journalled for free rotation to the casing. A fan blade assembly is secured to the inner end of the cylindrical screen assembly so that air drawn through the radiator by the engine cooling fan, passes through the fan assembly of the screen assembly and rotates the screen assembly. A blanking plate is supported within the screen assembly which blanks off part of the screen as it passes thereby, so that no air passes into the screen assembly in this area. This releases chaff or other debris normally held on the surface of the screen by suction. The fan blade assembly is provided with small additional blades on the periphery thereof, positioned to generate a slight positive pressure in the annular area betwen the periphery of the fan blade assembly and the casing as the screen assembly rotates, in order to provide an air seal and to prevent any chaff or other debris from being drawn into the radiator around this area.

19 Claims, 11 Drawing Figures

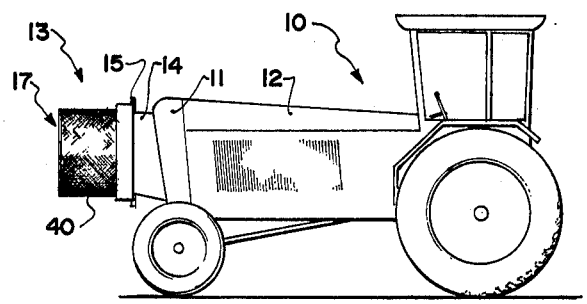
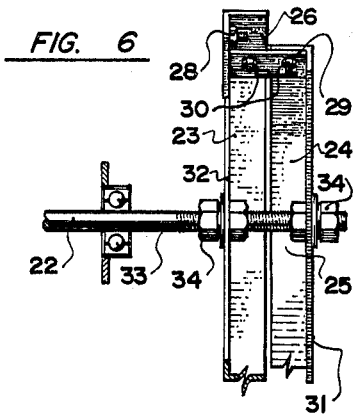
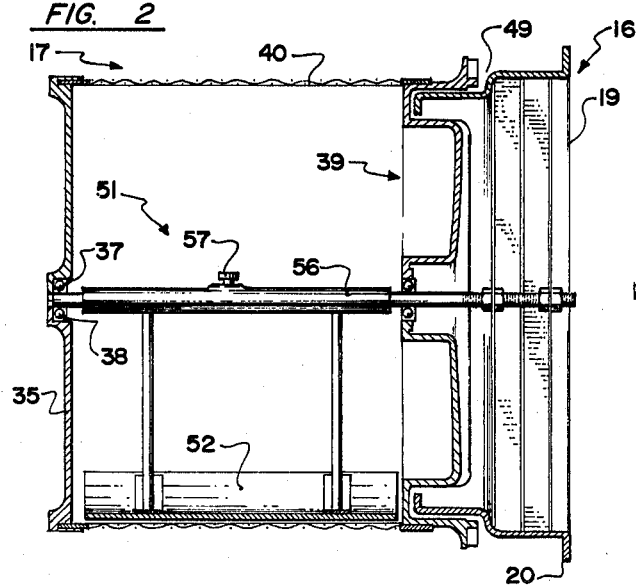
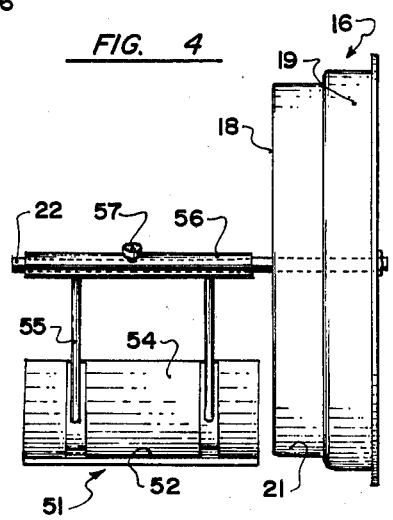
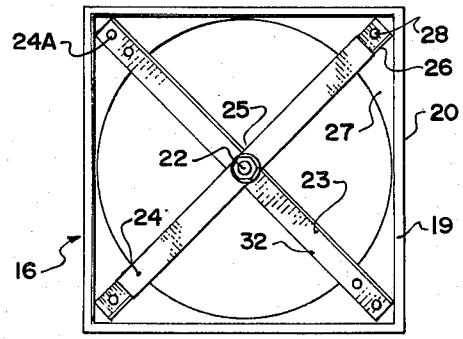
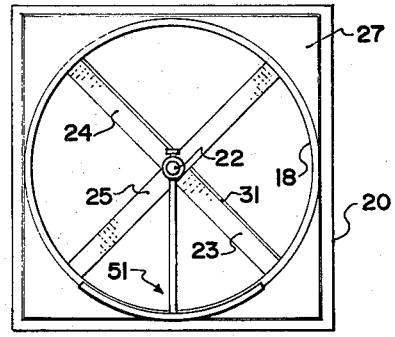

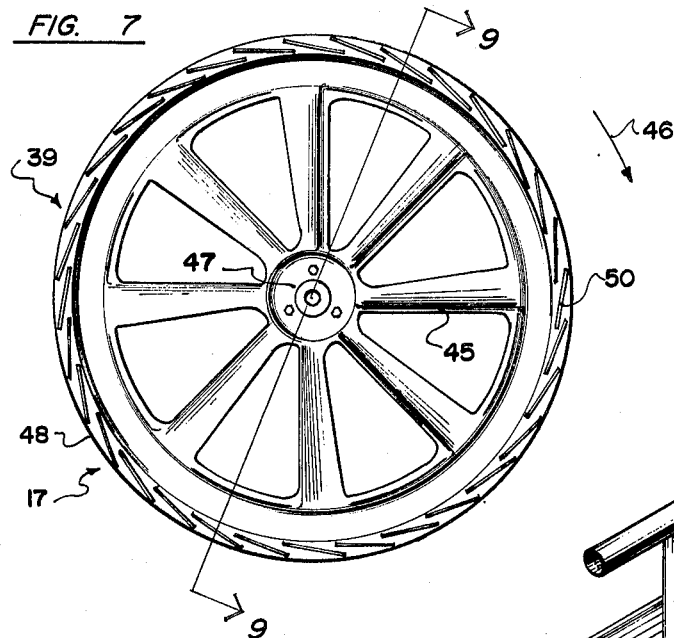
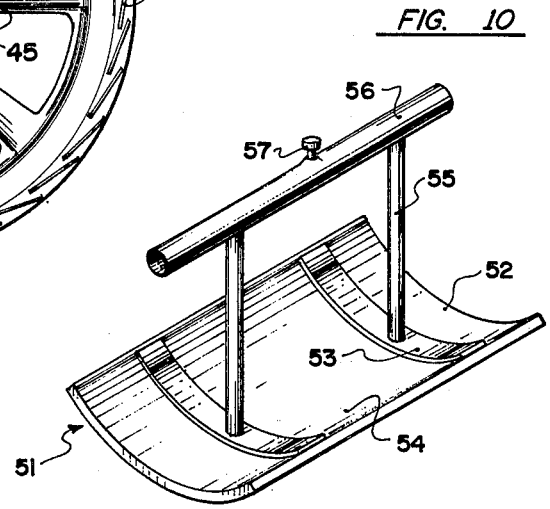
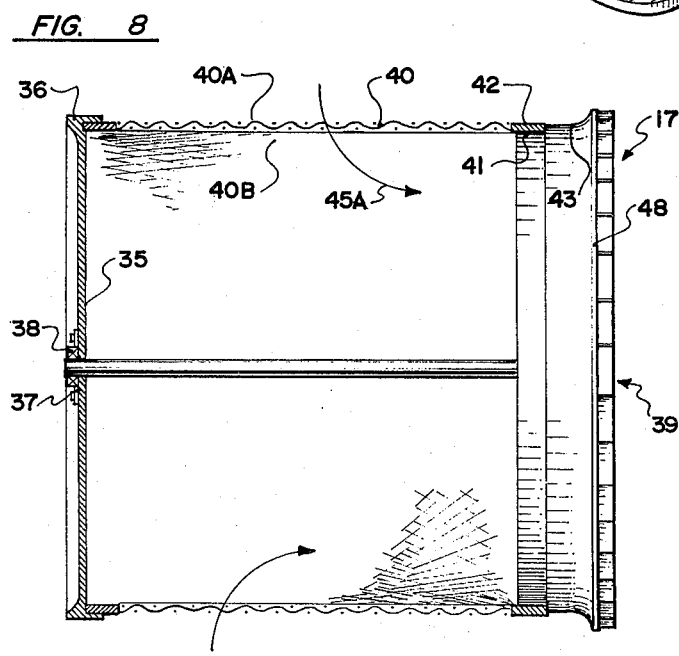
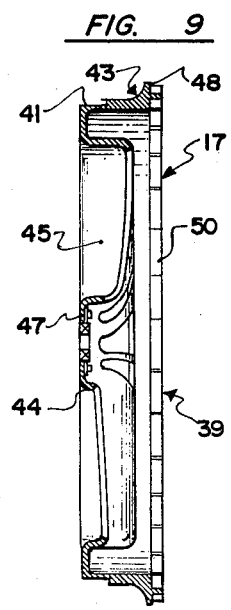

The length of the legs 55 is such that the outer surface of the plate segment 52, is in relatively close proximity to the inner surface 40B of the screen but of course it should not touch this inner surface, otherwise it would restrict the rotation of the screen component.

However, when positioned, and as the screen rotates, it blanks off air entering the screen, from the portion of the screen passing this plate 52 and in this connection it should be observed that the length of plate 52 is such that it extends almost from end to end of the screen 40.

This means that as the suction is relieved from the portion of the screen passing the plate, debris such as chaff and straw will be released and may fall from the screen portion which is passing the plate.

The plate can be positioned in any desired relationship radially, to the screen depending upon wind conditions and the like.

In operation, the screen assembly is secured to the front of the radiator air intake by means of the adaptor collar or shroud 14 or, under certain circumstances, it may be secured directly around the air intake with suitable sealing material (not illustrated) being provided. In either case, the casing should be secured in sealing relationship around the air intake so that all of the air entering the air intake and thence entering the radiator core, must pass through the cylindrical screen 40.

The screen filters out relatively large dust particles having a diameter larger than the screen mesh, from the air passing through the screen and also filters out straw, chaff and the like.

The air passing through the screen and thence through the fan assembly 39, causes the screen to rotate so that it continuously passes the screen blanking plate 51 thus releasing straw and chaff from the exterior surface of the screen and maintaining it in a relatively clear condition at all times.

It should be emphasized that it is the movement of the air through the assembly which rotates the screen and not any other source of power derived from the engine.

Leakage of air into the assembly through the annular channel 49 is prevented by the positive pressure generating blades 50 formed around the periphery of the portion 48 of the component 39.

The device is relatively lightweight and is easily attached to radiator air intakes thus maintaining the radiator cores thereof relatively clean and in an unclogged condition.

FIG. 11 shows the preferred construction of the inner end 18 of the casing which includes an annular flange 58 extending forwardly of the front end 18 and spaced inwardly from the outer perimeter 59. A small bead or further flange 60 extends around the front face 61 spaced from the flange 58.

The blades 45 extending radially from the hub 44, terminate in the peripheral rim portion collectively designated 62 and this portion is shaped to fit around the flange 58 but in slightly spaced relationship therefrom forming a U-shaped shroud 63 spaced inwardly from the outer periphery 64 of this portion. The planar portion 65 between the outer periphery 64 and the U-shaped portion 63 carries the aforementioned blades 50 to develop positive air pressure at this point. The portion 65 is situated within the annular channel 66 defined by one side of the flange 58, one side of the bead 60 and the wall portion 67 of the stationary part 59. This gives a much more efficient sealing area and assists blades 50 in maintaining the positive pressure and preventing any dust or debris entering into the blades 45 from the outside of the casing 16.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A screen assembly for the radiator intakes of the engines of tractors, farm equipment such as combines, trucks and the like comprising in combination support means attachable to the front of the radiator air intake, a substantially cylindrical screen component journalled for rotation upon said support means whereby substantially all air entering said radiator air intake passes through said screen component, said screen component including air operated means to rotate said screen component in one direction as air passes therethrough and into the radiator air intake and means to substantially seal the area between said support means and said screen component, said last mentioned means including the inner end of said screen component engaging said support means in spaced relationship therefrom thereby defining an annular channel between said support means and the inner end of said screen component, said channel constituting said area between said support means and said screen component, and means formed around the periphery of said screen component, and means formed around the periphery of said inner end of said screen component and positioned to develop positive air pressure within said annular channel directed radially outwardly from the interior of said screen component and through said annular channel, when said screen component is rotating, said means formed around the periphery of said inner end of said screen component comprising a plurality of relatively small blades formed around the periphery of said inner end.

2. The screen assembly according to claim 1 in which said screen component is a substantially hollow cylinder having a closed outer end with at least the peripheral wall of said cylinder being formed of screening material allowing air to pass therethrough but preventing the passage of material larger than a predetermined size.

3. The screen assembly according to claim 2 in which said air operated means includes a fan blade assembly on said screen component at the inner end thereof and in the path of air entering said radiator air intake.

4. The screen assembly according to claim 2 in which said screen component includes bearing means at each end thereof, said support means including a support casing and screen component support means in said casing, said screen component support means comprising a shaft extending from said casing and cantilevered therefrom, said screen component being journalled for rotation upon said shaft.

5. The screen assembly according to claim 4 in which said casing includes on the outer side thereof, an annular flange extending perpendicular to the plane of the outer side and being spaced from the periphery thereof, an annular bead extending perpendicular to the plane of the outer side between said flange and said periphery, said fan blade assembly including an annular U-shaped cross sectional outer portion engaging around said flange, but being spaced therefrom, and a planar wall portion extending from said U-shaped cross sectional outer portion and engaging between said flange and said bead, but being spaced therefrom.

6. The screen assembly according to claim 3 in which said support means comprises a casing including, on the outer side thereof, an annular flange extending perpendicular to the plane of the outer side and being spaced from the periphery thereof, an annular bead extending perpendicular to the plane of the outer side between said flange and said periphery, said fan blade assembly including an annular U-shaped cross sectional outer portion engaging around said flange, but being spaced therefrom, and a planar wall portion extending from said U-shaped cross sectional outer portion and engaging between said flange and said bead, but being spaced therefrom.

7. The screen assembly according to claims 6 or 5 which includes means to release material adhering to the outer surface of said screen component said last mentioned means including a stationary curved screen blanking plate secured to said support means, and being situated in close, spaced proximity to said screen component and extending over a portion of said screen component thereby preventing ingress of air through the part of said screen component passing said screen blanking plate, and means to support said screen blanking plate for selective adjustment around the inner periphery of said screen component.

8. The screen assembly according to claim 1 in which said air operated means includes a fan blade assembly on said screen component at the inner end thereof and in the path of air entering said radiator air intake.

9. The screen assembly according to claims 1, 2 or 3 which includes means to release material adhering to the outer surface of said screen component said last mentioned means including a stationary curved screen blanking plate secured to said support means, and being situated in close, spaced proximity to said screen component and extending over a portion of said screen component thereby preventing the ingress of air through the part of said screen component passing said screen blanking plate and means to support said screen blanking plate for selective adjustment around the inner periphery of said screen component.

10. The screen assembly according to claim 8 in which said screen component includes bearing means at each end thereof, said support means including a support casing and screen component support means in said casing, said screen component support means comprising a shaft extending from said casing and cantilevered therefrom, said screen component being journalled for rotation upon said shaft.

11. The screen assembly according to claim 10 in which said casing includes on the outer side thereof, an annular flange extending perpendicular to the plane of the outer side and being spaced from the periphery thereof, an annular bead extending perpendicular to the plane of the outer side between said flange and said periphery, said fan blade assembly including an annular U-shaped cross sectional outer portion engaging around said flange, but being spaced therefrom, and a planar wall portion extending from said U-shaped cross sectional outer portion and engaging between said flange and said bead, but being spaced therefrom.

12. The screen assembly according to claim 11 which includes means to release material adhering to the outer surface of said screen component said last mentioned means including a stationary curved screen blanking plate secured to said support means, and being situated in close, spaced proximity to said screen component and extending over a portion of said screen component thereby preventing ingress of air through the part of said screen component passing said screen blanking plate, and means to support said screen blanking plate for selective adjustment around the inner periphery of said screen component.

13. The screen assembly according to claim 10 which includes means to release material adhering to the outer surface of said screen component said last mentioned means including a stationary curved screen blanking plate secured to said support means, and being situated in close, spaced proximity to said screen component and extending over a portion of said screen component thereby preventing ingress of air through the part of said screen component passing said screen blanking plate, and means to support said screen blanking plate for selective adjustment around the inner periphery of said screen component.

14. The screen assembly according to claim 1 in which said screen component includes bearing means at each end thereof, said support means including a support casing and screen component support means in said casing, said screen component support means comprising a shaft extending from said casing and cantilevered therefrom, said screen component being journalled for rotation upon said shaft.

15. The screen assembly according to claims 3, 14 or 4 which includes means to release material adhering to the outer surface of said screen component said last mentioned means including a stationary curved screen blanking plate secured to said support means, and being situated in close, spaced proximity to said screen component and extending over a portion of said screen component thereby preventing ingress of air through the part of said screen component passing said blanking plate, and means to support said screen blanking plate for selective adjustment around the inner periphery of said screen component.

16. A screen assembly for the radiator intakes of the engines of tractors, farm equipment such as combines, trucks and the like comprising in combination support means attachable to the front of the radiator air intake, a substantially cylindrical screen component journalled for rotation upon said support means whereby substantially all air entering said radiator air intakes passes through said screen component, said screen component including air operated means formed on said screen component to rotate said screen component in one direction as air passes therethrough and into the radiator air intake and means to substantially seal the area between said support means and said screen component, said last mentioned means including a cylindrical portion on the outer side of said support means adjacent the inner end thereof, the inner end of said screen component engaging said cylindrical portion in spaced relationship therefrom thereby defining an annular channel between said cylindrical portion and the inner end of said screen component, said channel constituting said area between said support means and said screen component, and means formed around the periphery of said inner end of said screen component and positioned to develop positive air pressure within said annular channel directed outwardly from the interior of said screen component and through said annular channel, when said screen component is rotating, said support means including a casing, said casing including on the outer side thereof, an annular flange extending perpendicular

SELF-CLEANING SCREEN ASSEMBLY FOR RADIATOR AIR INLETS

This application is a continuation-in-part of application Ser. No. 918,815 filed June 26, 1978 and now abandoned.

BACKGROUND OF THE INVENTION

This invention relates to new and useful improvements in screen assemblies, particularly screen assemblies adapted to be used on radiator air intake areas of equipment such as farm tractors, combines, trucks and the like which operate under extremely dusty conditions.

When used for example, in farm operations, particularly during harvesting, the radiators of liquid cooled engines such as those used on tractors, combines, trucks and the like, often become plugged with dust, chaff, straw and other debris thus reducing considerably the efficiency of the radiator and often resulting in overheating.

Attempts have been made to screen these air intakes but unfortunately, the dust, chaff, debris and the like merely collects on the screen and is held there by the pressure of the air being drawn through the radiator by the fan blade assembly once again resulting in a restriction of the air passing over the radiator and often resulting in overheating occurring.

SUMMARY OF THE INVENTION

The present invention overcomes these disadvantages of existing screens by providing a screen assembly which includes means to reduce the adherance of debris and the like on the screen and one aspect of the invention consists of a screen assembly for the radiator air intakes of the engines of tractors, farm equipment such as combines, trucks and the like comprising in combination a hollow open ended support casing attachable to the front of the radiator air intake and extending outwardly therefrom, screen support means secured to said casing and extending therefrom, a screen component journalled for rotation upon said support means whereby all air entering said radiator air intake passes through said screen component, air operated means on said screen component to rotate said screen component in one direction as air passes therethrough and into the radiator air intake, and means to remove material adhering to the outer surface of said screen component as said screen component rotates. A plurality of small blades are formed around the screen component at the inner end thereof to develop positive air pressure radially outwardly from between the inner end of the screen component and the casing, in order to prevent dust, debris and the like from entering the screen component through this gap.

Another advantage of the invention is that it is readily adapted for attachment to the radiator air intakes of different types of tractors and the like by means of a simple adaptor shroud.

A still further advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a schematic view of a tractor showing the device attached to the front of the radiator thereof.

FIG. 2 is a longitudinal cross section of the invention per se.

FIG. 3 is a rear elevation of the casing.

FIG. 4 is a side elevation of the casing with the screen blanking plate supported upon the support shaft.

FIG. 5 is a rear view of the casing with the screen assembly removed.

FIG. 6 is an enlarged fragmentary cross sectional view showing the supports for the support shaft.

FIG. 7 is a front elevation taken from the inner side of the fan blade assembly.

FIG. 8 is a longitudinal cross sectional view of the screen component per se.

FIG. 9 is a vertical section taken along the line 10—10 of FIG. 7.

FIG. 10 is an isometric view of the screen blanking plate component per se.

In the drawings like characters of reference indicate corresponding parts in the different figures.

DETAILED DESCRIPTION

Figure 11:
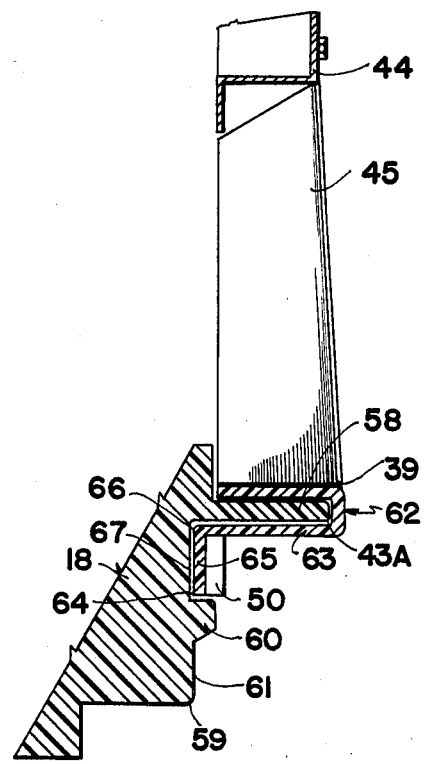
FIG. 11 is an enlarged fragmentary cross sectional view of the preferred embodiment of the front side of the casing.

Proceeding therefore to describe the invention in detail, reference should first be made to FIG. 1 which illustrates a tractor generally designated 10 having a radiator assembly 11 on the front end thereof and in front of the engine compartment 12, said radiator including an air intake (not illustrated) on the front side thereof as is conventional.

The screen assembly collectively designated 13 is secured to an adaptor shroud 14 by means of nut and bolt assemblies 15 and the adaptor shroud is shaped to suit the front of the screen assembly 13 as will hereinafter be described and to be secured by the rear end thereof to the particular radiator to which the device is to be attached. As these radiators vary in configuration, so will the inner end of the adaptor shroud or collar vary. Suffice it to say that this collar or shroud should be in sealing engagement around the air intake to the radiator assembly 11.

It will also be appreciated that although the device is shown attached to a tractor 10, nevertheless it is equally useable with any liquid cooled engine such as engines which may be used to power self-propelled combines, swathers, farm trucks or any other vehicle operating in a dusty or debris laden environment in which the debris may be drawn into the radiator core and partially block same.

The screen assembly collectively designated 10 includes a support means including a support casing collectively designated 16 with a screen component collectively designated 17 journalled for free rotation to the casing and extending forwardly therefrom.

In this particular embodiment, the casing, which is made from synthetic plastic but can of course be made from metal, is substantially rectangular when viewed in end elevation and is hollow having an open front side 18 and an open rear side 19.

The rear side 19 includes a surrounding flange 20 by which it may be secured as by the aforementioned nut and bolt assemblies 15, to the front of the adaptor or collar 14.

The casing extends forwardly from the flange 20 and terminates in a substantially cylindrical front side 18 shown specifically by reference character 21.

The support means also include means to support the screen component 17 for free rotation relative to the casing, said means taking the form of a stationary shaft 22 supported at the inner end thereof centrally of the casing 16 and extending outwardly therefrom cantilever fashion.

The means to support the shaft, in this particular embodiment, takes the form of an angulated member 23 secured diametrically across the cylindrical front side 18 of the casing and being secured thereto by means of nut and bolt assemblies 24A or the equivalent.

A further angulated member 24 also is secured diametrically across the cylindrical front side 18 substantially at 90° to the member 23 and means are provided to space the member 24 inwardly from the member 23 so that clearance is provided at the point of intersection indicated by reference character 25. In this particular embodiment, small angle brackets 26 are secured to the planar portion 27 of the casing by means of nut and bolt assemblies 28 at positions spaced from the securement of the first mentioned member 23.

Relatively short struts 29 are in turn secured to these angle brackets 26 and the angulated member 24 is in turn secured to these struts, nut and bolt assemblies 30 being used to secure the struts to the members 23 and the members 24 to the strut 29.

The spaced and parallel flanges 31 and 32 of the members 24 and 23, are apertured and receive an elongated shaft 22 which is screw threaded at the inner end thereof as indicated by reference character 33 and the shaft is locked to these flanges 31 and 32 by means of lock nut and washer assemblies 34 clearly shown in FIG. 6. This provides spaced apart support for the shaft so that it can extend in cantilevered fashion, forwardly of the casing 10 as clearly illustrated.

It will also be appreciated that the shaft extending through the angulated members 23 and 24, and being at the intersection of these members, extends substantially axially of the center of the cylindrical portion 18 of the casing.

The screen assembly collectively designated 17 consists of an outer end panel 35 which is substantially circular when viewed in end elevation. This end panel as shown in FIG. 8, includes an annular rim 36 and a bearing support hub 37 centrally thereof with a ball or roller bearing 38 secured to the hub and engageable over the distal end of the shaft 22.

An inner component collectively designated 39 is provided and also supported upon the shaft as will hereinafter be described, and a cylindrical screen 40 extends between the end plate 35 and the component 39. This relatively fine meshed screen engages within the rim or flange 36 of the outer plate 35 and over the rear cylindrical wall portion 41 of the component 39 with a stiffening band 42 being secured around the outer surface of the inner end of the screen 40. This mounts the screen component for free rotation upon shaft 22 and means are provided to rotate this screen component in one direction at any time air is being drawn through the screen 40 and into the radiator assembly 14.

In this connection reference should be made to FIGS. 7, 8 and 9.

The component 39 which is preferably made of synthetic plastic but can of course be stamped from metal, takes the form of a fan blade assembly with a surrounding rim collectively designated 43, a hub 44, and a plurality of angulated blades 45 extending radially outwardly from the hub 44 to the rim area 43.

These blades are angulated so that air passing inwardly through the screen 40 in the direction of arrows 45A, and then through the fan blade assembly to the radiator intake, rotates the screen component 17 in the direction of arrow 46 (see FIG. 7).

The hub 44 includes a bearing assembly 47 which in turn supports this end of the component upon shaft 22 so that the screen component 17 freely rotates upon this shaft 22. The positioning of the fan blades ensures that the screen component rotates only in the direction of arrow 46 when air is passing therethrough, the reasons for which will hereinafter be described.

It will be noted that the rim 43 of the component 39 includes an inner wall 48, the length of which lies substantially parallel to the longitudinal axis of the shaft 22 and that this inner wall overlies the cylindrical portion 18 of the casing when the screen component is installed as illustrated in FIG. 2. In order to provide free rotation of the screen component 17 upon shaft 22, it is not possible to have a wipe or seal contact between the portion 48 and the portion 18 so that an annular channel or space 49 is defined between the portions 48 and 18.

Obviously, with the engine operating and the engine fan drawing air through the radiator air intake, there is the possibility that debris, chaff, dust and the like will be drawn in through this annular gap or channel 49 and thence into the radiator core. Means are provided to relieve this condition, said means taking the form of a plurality of relatively small blades 50 formed around the periphery of the component 39 and situated around the portion 48 thereof. These are so directed that when the screen component is rotating in the direction of arrow 46, air under positive pressure is generated by the blades 50 flowing from the interior of the screen component and outwardly through the annular channel 49 thus eliminating or at least reducing considerably, any chance of debris such as chaff, straw and the like from entering through this annular channel.

It will of course be appreciated that the debris such as chaff, straw and large particles, will be held onto the outer surface 40A of the screen 40 while air is passing through the screen and the screen is rotating. If the engine is operating for any length of time, then obviously this screen will become clogged thus reducing the air intake to the radiator. Means are therefore provided to enable release of this material on a continuous basis as the screen is rotated and reference should be made to FIGS. 2, 4 and 10 in this regard.

This shows a screen blanking plate assembly collectively designated 51. It consists of an arcuately curved plate 52, the curvature of which is substantially similar to the curvature of the screen 40. Reinforcing strips 53 may be secured to the inner surface 54 of this plate and a pair of legs 55 extend upwardly from these stiffeners or plates 53, to a cylindrical tube 56 which in turn engages over the aforementioned shaft 22 on the interior of the screen components 17 as clearly shown in FIG. 2.

A clamp bolt 57, screw threadably engages through the wall of the tube 56 and clamps the device in the desired relationship radially, relative to the screen 40.

to the plane of the outer side and being spaced from the periphery thereof, an annular bead extending perpendicular to the plane of the outer side between said flange and said periphery, said air operated means including a fan blade assembly on said screen component at the inner end thereof and in the path of air entering said radiator air intake, said fan blade assembly including an annular U-shaped cross sectional outer portion engaging around said flange, but being spaced therefrom, and a planar wall portion extending from said U-shaped cross sectional outer portion and engaging between said flange and said bead, but being spaced therefrom.

17. The screen assembly according to claim 16 in which said screen component is a substantially hollow cylinder having a closed outer end with at least the peripheral wall of said cylinder being formed of screening material allowing air to pass therethrough but preventing the passage of material larger than a predetermined size.

18. The screen assembly according to claim 17 in which said screen component includes bearing means at each end thereof, said screen support means comprising a shaft extending from said casing and cantilevered therefrom, said screen component being journalled for rotation upon said shaft.

19. The screen assembly according to claims 16, 17 or 18 in which said means formed around the periphery of said inner end of said screen component comprises a plurality of relatively small blades formed around the periphery of said inner end.

* * * * *